N. GOLDBERG.
WIND SHIELD.
APPLICATION FILED JAN. 10, 1916.
1,218,994.
Patented Mar. 13, 1917.
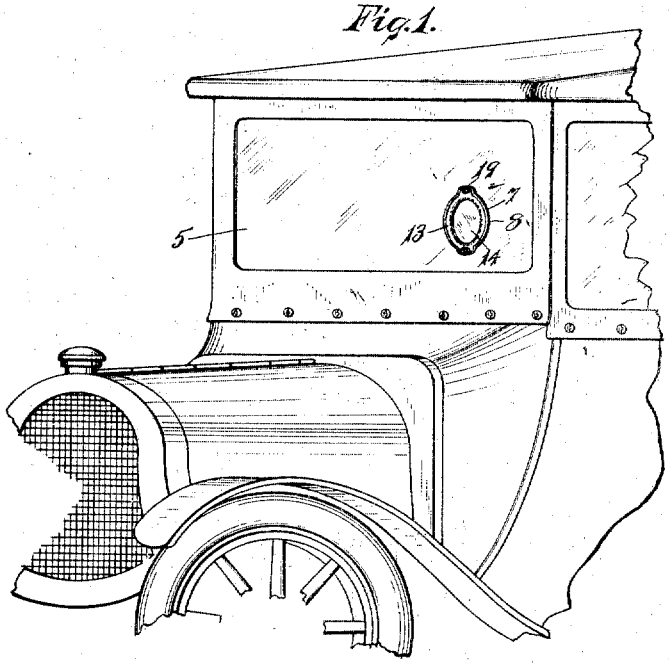
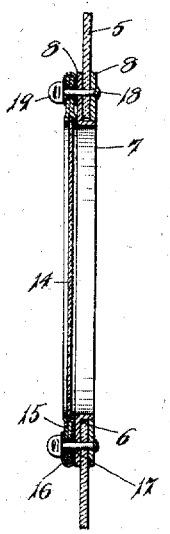
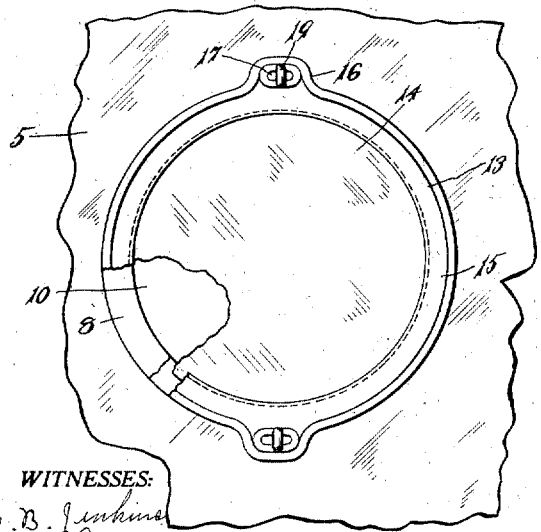
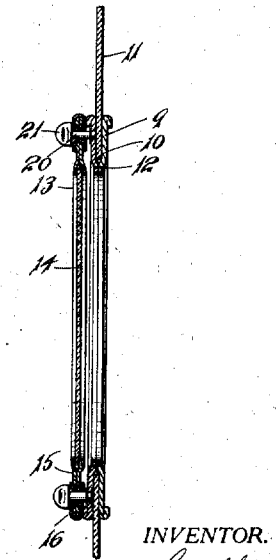
WITNESSES:
INVENTOR.
Naiman Goldberg.
BY
Arthur B. Jenkins,
ATTORNEY.

UNITED STATES PATENT OFFICE.

NAIMAN GOLDBERG, OF HARTFORD, CONNECTICUT.

WIND-SHIELD.

1,218,994. Specification of Letters Patent. Patented Mar. 13, 1917.

Application filed January 10, 1916. Serial No. 71,165.

*To all whom it may concern:*

Be it known that I, NAIMAN GOLDBERG, a citizen of the United States, residing at Hartford, in the county of Hartford and State of Connecticut, have invented a new and Improved Wind-Shield, of which the following is a specification.

My invention relates to the class of devices employed more especially upon vehicles to protect the occupants from the wind, and an object of my invention, among others, is to provide means whereby the shield may be effectively used in all kinds of weather.

One form of device embodying my invention and in the construction and use of which the objects herein set out, as well as others, may be attained, is illustrated in the accompanying drawings, in which—

Figure 1 is a perspective view of a portion of a vehicle illustrating my improved wind shield in place thereon.

Fig. 2 is a view, scale enlarged, of a portion of the wind shield with parts broken away to show construction.

Fig. 3 is a detail view in cross section through the shield on plane passing through the center of the opening therein.

Fig. 4 is a detail view illustrating the construction of a frame composed of flexible material.

In the use of wind shields of transparent material in connection with vehicles, more especially motor vehicles, clear vision is frequently prevented by the collection of moisture, frost or the like upon the surface of the shield, and to overcome this defect sight holes are commonly made in the material comprising the shields. In the use of heavy vehicles especially these wind shields are frequently constructed of celluloid or other brittle material, and when the holes are formed through this material the latter is liable to break and crack about the edges of the holes. Another objection to such holes is that in clear weather when vision is not obstructed the wind passes in through the holes in the shields to the inconvenience of the occupants of the vehicles.

My improved wind shield herein illustrated and described overcomes these objections by providing means whereby the edges of the sight opening are protected from injury and it also provides means whereby such opening may be closed when desired in a manner not to obstruct the vision.

Such a device is shown in the accompanying drawings, in which the numeral 5 indicates a wind shield that may be composed of glass, celluloid or other suitable material, having a sight opening 6 located in any desired place. In carrying out my invention I provide a frame 7 that is constructed of any suitable material, as shown herein this frame being composed of two rings 8, having openings to register with the sight opening 6, the size of the rings being sufficient to permit them to project for a proper distance beyond the edges of the sight opening.

The frame comprising the rings 8 as illustrated in Figs. 1 to 3 inclusive, is especially adapted for use in connection with wind shields of celluloid or similar material, the openings in these rings being of a size substantially the same as the sight opening 6 and being formed of comparatively rigid material the edges of the sight opening in the celluloid are strengthened and thoroughly protected from breaking.

In many instances I have found it of material advantage to make the rings of flexible material, such a structure being shown in Fig. 4 of the drawings in which the rings 9 are composed of leather or other tough fibrous material of a size approximately that of the opening 10 through the shield 11 of glass or like material. A row of stitching 12 may be employed to unite the rings at their inner edges and such a frame will have sufficient flexibility to permit it to be inserted through the hole and adjusted in place.

A cover 13 of a size to close the sight opening is formed for removable attachment to the frame, this cover being composed of transparent material to permit vision through the sight opening when the cover is in place. A satisfactory construction is shown herein in which the cover is formed from a disk 14 of transparent material, as celluloid, this disk being bounded, if desired, by a border 15 of rigid or tough flexible material, which order in the form herein shown, is composed of rings of substantially the size of the rings 8 comprising the frame 7.

In the preferred form of construction, these are formed with ears 16 preferably located on diametrically opposite sides of the rings comprising the frame and also of the border, the frame and border in fact being of substantially the same shape. Holes 17 are formed through the ears of the border to receive studs 18 from the frame. When composed of metal these studs will preferably be secured to the ring on one side of the shield 5 and will project through the ring 8 on the opposite side and through the opening 17. A head or button 19 is formed rigidly on the stud, the latter being rotatable. This button or head is oblong in form to pass through the oblong opening 17 and when turned to the position shown in Fig. 2 it will securely hold the cover in place.

When the frame is composed of flexible material the stud 20 will be secured to the ring 9 on the same side of the shield as that on which the cover is to be secured, the stud being rotatable to permit operation of the button 21 in the same manner as hereinbefore described.

While I have shown and described herein a satisfactory construction of wind shield embodying my ideas, this may be departed from to a greater or lesser degree and yet be within the spirit and intent of the invention.

I claim—

A wind shield having a comparatively small opening therein comprising a sight opening, a frame attached to the shield around said opening, a cover of transparent material to close said opening, and means upon the cover and frame to secure the cover in place and for bodily removal from the shield, the said means extending completely through the wind shield, frame and cover.

NAIMAN GOLDBERG.